United States Patent [19]

Bordeaux et al.

[11] Patent Number: 4,462,474
[45] Date of Patent: Jul. 31, 1984

[54] WEIGHT MONITORING APPARATUS

[75] Inventors: John J. Bordeaux; John D. Miller, both of Sunnyvale, Calif.

[73] Assignee: Digico, Sunnyvale, Calif.

[21] Appl. No.: 402,255

[22] Filed: Jul. 27, 1982

[51] Int. Cl.³ ............... G01G 23/36; G01G 23/14; G01G 3/14
[52] U.S. Cl. .................. 177/48; 177/165; 177/210 FP; 177/1
[58] Field of Search ................... 177/45-48, 177/165, 210 FP, 1

[56] References Cited

U.S. PATENT DOCUMENTS

| | | | |
|---|---|---|---|
| 4,034,361 | 7/1977 | Mortensen | 177/46 X |
| 4,176,349 | 11/1979 | Fliegel | 177/48 X |
| 4,198,626 | 4/1980 | Rauscher | 177/48 X |

Primary Examiner—George H. Miller, Jr.
Attorney, Agent, or Firm—Limbach, Limbach & Sutton

[57] ABSTRACT

A weight monitoring apparatus which is suitable for use in a computerized control system and which provides a visual net relative weight indication, as well as an alarm, indicative that an alarm level weight is being approached by the article being weighed.

18 Claims, 4 Drawing Figures

WEIGHT MONITORING APPARATUS

DESCRIPTION

1. Technical Field

The present invention relates generally to the weighing art and, particularly, to a relative weight monitoring scale for use where an absolute weight traceable to a recognized weighing standards is not required.

2. Background Art

In the semiconductor fabrication industry, a variety of substances are used in the fabrication process. Often, these substances are stored in liquid form and used in gaseous (vapor) form. Often, the only method of determining the amount of such material used is to measure the decrease in weight of the substance. The substance weight will hereinafter be referred to as "product weight". Thus, it is desirable to have a weight monitoring device by which the decrease in product weight can be observed.

Additionally, it is critical to the efficient operation of the typical semiconductor fabrication process that the rate of product use be known and that the product be continuously available. Thus, it is also desirable to provide a means for monitoring the rate at which the product is being consumed and for providing an alarm whenever the amount of product remaining reaches a critically low level.

A further desirable feature of such a monitoring system is the availability of data that is indicative of the product weight and rate of change and which is suitable for use by a computer. The computer can, thereafter, utilize such information to monitor, maintain a history and automatically control the various operations during the semiconductor fabrication process.

In a typical operation, the product which is to be monitored is stored within a gas cylinder, wherein the cylinder has a predefined weight and the product has an initial weight, the totality of the cylinder weight and the product weight comprising the gross weight. It is this gross weight that is normally available from a weighing of the cylinder and contents. In order for the weight measurement to be directly meaningful, the weight of the cylinder must be accounted for. Thus, a taring function is desirable in a weight monitoring system, wherein the container weight is "backed out" of the gross weight measurement, so that the decrease in product weight can be observed directly.

In the past, monitoring of such product weights has been conducted using, for example, ordinary bathroom scales or the like. The scale would be positioned beneath the gas cylinder, with the gas cylinder connected in the gas delivery system. The operator would then read the gross weight of the product and container from the scale and subtract the container weight, in order to obtain the product weight. The operator would be required to periodically check the weight of the cylinder and contents and, again, subtract off the container weight, in order to obtain the weight of the product remaining in the cylinder. This would be repeated until most of the product within the cylinder was used up, at which point a full cylinder could be substituted.

If the operator were not familiar with the rate of usage of the particular product, or if there was an abnormal usage of the product in the system, there was a real possibility that all of the product would be used up before the operator could substitute a new cylinder—a clearly unacceptable situation.

Thus, there is a vital need for an apparatus for monitoring the weight of an article, such as a cylinder containing a gas product, so that a direct reading of the amount of product remaining is provided, so that an alarm indication is also provided, and so that such an apparatus can be coupled to a computer for computerized monitoring of the product weight can be implemented.

DISCLOSURE OF THE INVENTION

The foregoing and other problems of prior art apparatus and methods for monitoring the weight of an article are overcome by the present invention of a method and apparatus, which includes scale means for providing a periodic gross weight measurement, wherein the magnitude of a gross weight measurement is indicative of the weight of the article being weighed. A tare means is provided which an operator can use to adjust the amount of container weight to be electrically subtracted from each periodic gross weight measurement. The tare means generates a conditioned weight signal which has a steady state magnitude that is a selectable fraction of the magnitude of the periodic gross weight signal. The resulting conditioned weight signal additionally has a rise time which is inversely proportional to the steady state magnitude of the conditioned weight signal. This rise time is determined according to a pre-determined time constant. Alarm means which are responsive to the conditioned weight signal generate an alarm indication whenever the magnitude of the conditioned weight signal is less than an adjustable reference magnitude, so that as the magnitude of the conditioned weight signal approaches the adjustable reference magnitude an alarm having an increasing duration is issued by the apparatus. Thus, the apparatus provides a warning signal which is indicative of the fact that the amount of product remaining in the cylinder is approaching a critical level, and, by the change in duration of the signal, also indicates generally the amount of product remaining.

The apparatus additionally provides a visual indication of the conditioned weight of the article being measured, so that the remaining product weight can be viewed by an operator directly.

Furthermore, the apparatus provides signals suitable for use in a computer in conjunction with an analog-to-digital converter, wherein the signals include a periodic, conditioned weight analog signal or a periodic gross weight analog signal, and a display zero-reference analog signal or an alarm target weight reference analog signal.

It is therefore an object of the present invention to provide a weight monitoring apparatus for monitoring the weight of an article in relation to a target weight, wherein an alarm indication is provided which indicates that the product weight is approaching a critical level.

It is another object of the present invention to provide a method and apparatus for monitoring the weight of an article, wherein the apparatus provides an alarm indication, the duration of which is indicative of the relative difference between the article weight and the target weight.

It is a further object of the present invention to provide an apparatus for monitoring the weight of an article, wherein the article is a cylinder containing a product, and furtherwherein the apparatus provides a direct reading of the weight of the amount of product remaining in the cylinder.

It is still another object of the present invention to provide an apparatus for monitoring the weight of an article, which is suitable for use in a computerized control system for monitoring the consumption of materials stored in containers.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE INVENTION

Figure 1:
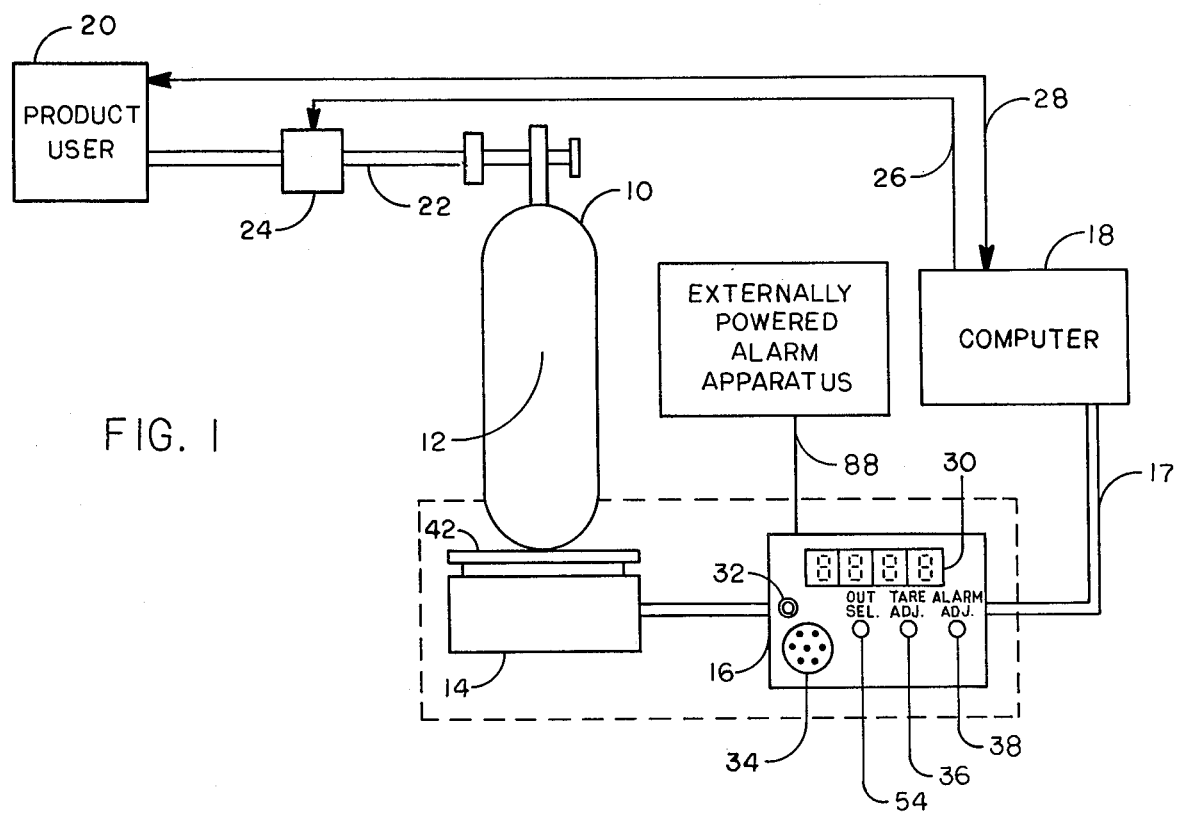
FIG. 1 is a functional block diagram of the present invention in a potential application.

Referring more particularly to FIG. 1, the use of the invention in a typical application is illustrated.

A gas cylinder 10 containing the product material 12 in liquid form is positioned on the gross weight measuring means 14, e.g. a scale. The processing portion 16 of the system receives the gross weight signal from the gross weight measuring means 14 and supplies gross weight data, conditioned weight data, and various reference and calibration magnitude data to computer 18 via analog outputs 17.

The product material 12 is supplied in gaseous form from cylinder 10 to the product user 20 via pressure line 22 and regulating valve 24. Regulating valve 24 is controlled by computer 18 via line 26. By way of bi-directional line 28, the computer supplies control data to and receives process information from product user 20.

In addition to the weight data supplied to computer 18, processing section 16 also provides to the operator a visual readout of the weight of the product material remaining in cylinder 10 via display 30, as well as an alarm indication via indicator light 32 and horn 34. In order to display the weight of the product material remaining in cylinder 10, the apparatus implements a net weight or taring function in processing section 16. The tare function of the processing section 16 is controlled via tare adjust knob 36, while the alarm threshold is adjusted via reference adjust knob 38.

Figure 2:
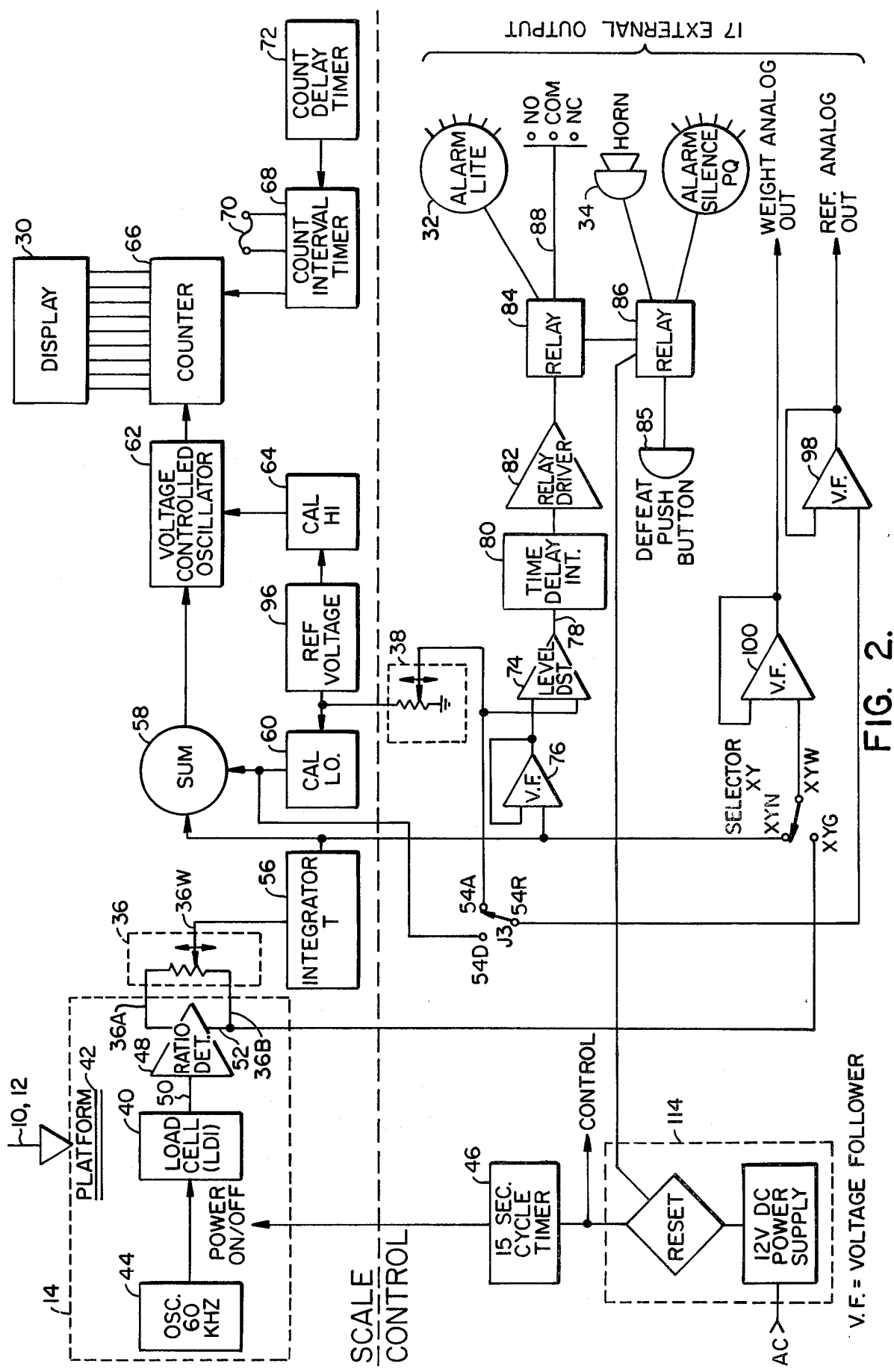
FIG. 2 is a simplified functional block diagram of the present invention.

Referring to FIG. 2, gross weight measuring means 14 and signal processing means 16 will now be described in greater detail. In the preferred embodiment of the present invention, the gross weight measuring means 14 comprises a load cell 40 which measures the load on a platform 42. The load cell 40 is supplied with a reference signal from oscillator 44 and is periodically timed off and on by timer 46.

The load cell 40 provides an output signal having a phase and amplitude which are proportional to the direction and magnitude of the force applied to the platform 12. The load cell output signal is supplied to ratio detector 48.

The ratio detector 48 converts the load cell output 50 into a direct current (DC) voltage which is proportional to the downward force of the platform. This DC voltage, supplied on line 52, is the gross weight signal, i.e. total weight of the cylinder 10 and the product material 12.

This gross weight signal, by virtue of the off and on timing by timer 46, varies periodically between zero and a steady state magnitude which is proportional to the total weight on platform 42. As the amount of product material 12 in cylinder 10 decreases, the steady state magnitude of the gross weight signal will decrease correspondingly.

The periodic gross weight signal is supplied to tare adjust means 36 and to terminal XYG of switch X4. Tare adjust means 36 provides a gross weight signal or a fractional signal which is a selectable fraction of the gross weight signal as selected by the user/operator. In the preferred embodiment of the present invention, tare adjust means 36 is a voltage divider having a variable resistance element. The voltage divider circuit is configured to supply a constant impedance to the gross weight signal. In the preferred embodiment of such an arrangement, a potentiometer is used wherein the gross weight signal is applied across the terminals 36A and 36B of the potentiometer and the fractional signal is taken from the wiper 36W of the potentiometer. In this manner, by varying the position of the wiper of the potentiometer, a fractional signal which is a selectable fraction of the gross weight signal can be obtained. It is to be understood that there are numerous other possible means for implementing the tare adjust function 36, for example, a resistive ladder network where the fractional signal is extracted from selected nodes on the ladder.

The fractional signal is then supplied to integrator circuit 56 in order to filter out high-frequency transients. In doing so, integrator 56 subjects the fractional signal to a selected time constant, which results in a signal having a rise time which is inversely proportional to the magnitude of the fractional signal. Thus, as the magnitude of the gross weight signal decreases, thereby causing the fractional signal to decrease, the rise time of the signal produced by integrator 56 increases. This signal will hereinafter referred to as the "conditioned weight signal". This conditioned weight signal is indicative of the remaining product material 12 in the cylinder 10.

The conditioned weight signal is supplied to summing circuit 58. Summing circuit 58 also receives a DC offset signal from Cal Lo circuit 60 for calibration purposes. The output of summing circuit 58 is supplied to voltage control oscillator (VCO) 62 along with a coarse calibrating voltage from Cal Hi 64.

VCO 62 produces a signal having a frequency which is proportional to the magnitude of the conditioned weight signal. As the conditioned weight signal magnitude decreases, the frequency of the signal from VCO 62 decreases correspondingly. Conversely, for a conditioned weight signal having a higher magnitude, the frequency of the signal will also be higher.

The DC offset signal from CAL Lo 60 is used to fine-adjust the VCO frequency so that the scale displays a zero weight when there is no load applied. The coarse calibrating voltage from CAL Hi 64 permits adjustment of the VCO frequency for proper linearity with respect to the conditioned weight signal.

The signal from VCO 62 is provided to counter 66. Counter 66 counts the number of cycles present in the VCO signal over a predetermined time interval. This time interval is supplied by count interval timer 68.

By judicious selection of the counting interval provided to counter 66, the count which is accumulated can be made to correspond directly to the product weight in the cylinder. Similarly, the counter interval can be selected so that the count accumulated is in units of pounds (English system) or kilograms (Metric system). In FIG. 2, jumper 70 is shown by which a conversion from units of pounds to units of kilograms, or vice versa, can be implemented. Such a conversion would require a count period which is 2.2 times longer than the count period for units of kilograms. The count period is selected according to the force to magnitude/phase relationship of the load cell, the phase to volts conversion factor of the ratio detector, and the voltage to frequency conversion factor of the VCO.

In FIG. 2, count delay timer circuitry 72 is shown connected to count interval timer 68. Count delay timer 72 provides a control signal to count interval timer 68, such that when power is applied to the circuitry of gross weight measuring means 14, a predetermined time delay is implemented before a weight is displayed by display 30. This is to permit the various circuits to settle to a steady state condition prior to sampling them for processing and readout. Timer 46 periodically resets counter 66 and timers 70 and 72 to concide with the on/off timing of the gross weight measuring means.

The alarm feature of the present invention is implemented by comparing the coinditioned weight signal from filter 56 to a reference magnitude from alarm set control 38. As can be seen in FIG. 2, level detector 74 receives, at one of its inputs, the reference magnitude signal from alarm set control 38 while receiving a buffered conditioned weight signal from filter 56 via voltage follower 76. Level detector 74 compares the reference magnitude signal to the conditioned weight signal. Whenever the conditioned weight signal drops below the reference magnitude signal, the level detector 74 provides an alarm signal on line 78.

This alarm signal 78 is supplied to a time delay integrator 80 and thence to a relay driver 82. Time delay integrator 80 filters out the high frequency components from the alarm signal while relay driver 82 provides power amplification for driving relay 84.

Relay 84 receives the power amplified alarm signal, and in response thereto, activates alarm light 32 and horn 34. When horn relay 86 is deactivated, horn 34 is caused to sound. Relay 84 also supplies an alarm signal for use by external users, such as a computer or an externally powered alarm apparatus, on line 88. Switch 85 activates relay 86 so that horn 34 can be shut-off by the operator, if desired. Alarm silence light PQ indicates to the operator that the horn circuit is deactivated.

Figure 3:
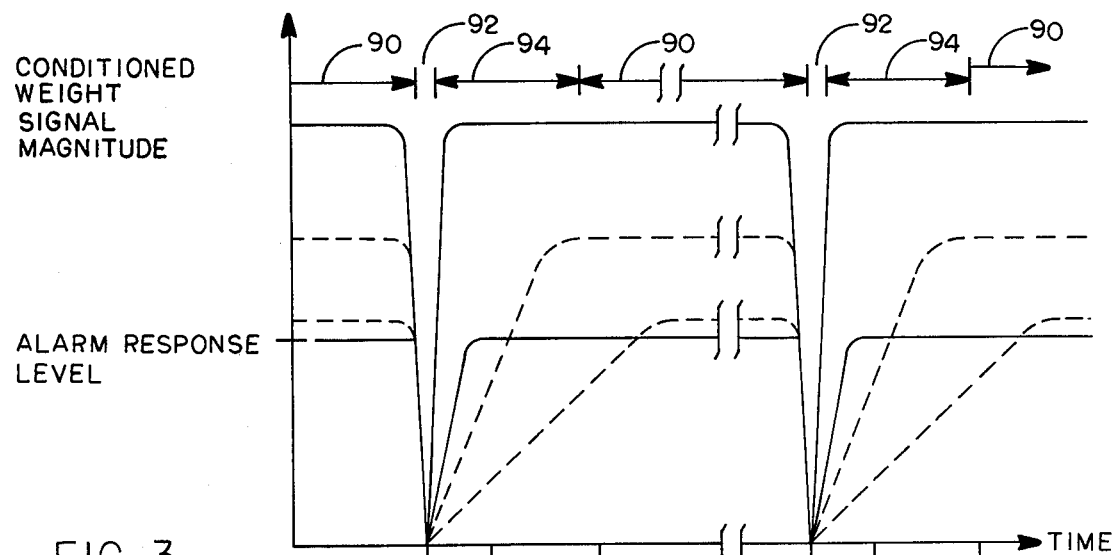
FIG. 3 is a graphical illustration of the manner in which the alarm indication is generated in the present invention.
Figure 3:
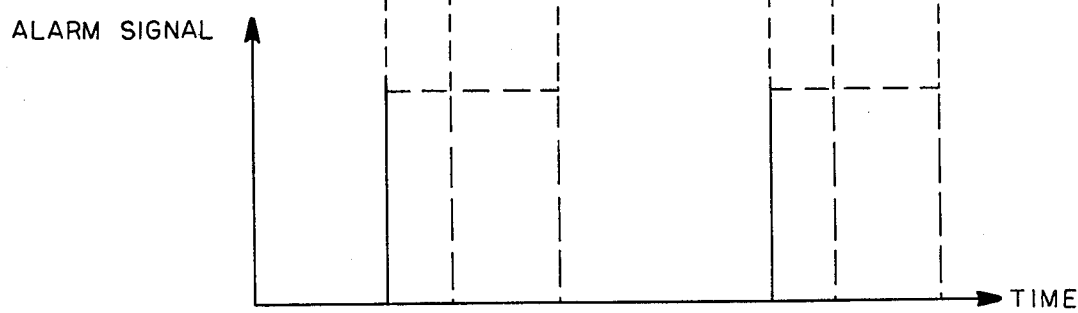

From FIG. 2, it can be seen that alarm light 32 and horn 34 will be activated whenever an alarm signal is presented by level detector 74. Referring to FIG. 3, the manner in which the alarm signal is generated will be explained in greater detail. FIG. 3 illustrates the conditioned weight signal during the on and off cycling by timer circuit 46. The portion of the conditioned weight signal bearing reference numeral 90 corresponds to the steady state magnitude of the conditioned weight signal. When the gross weight measuring means 14 are deactivated by timer circuit 46, the conditioned weight signal resembles the portion of the curve having reference numeral 92. It should be noted that this portion is fairly steep and associated with a very small time period.

When the timer circuit 46 re-applies power to the gross weight measuring means 14, the conditioned weight signal resembles the portion of the curve labelled 94. This portion of the curve increases toward a particular steady state magnitude according to a predetermined time constant T. Thus, from FIG. 3, it can be seen that for smaller steady state magnitudes, the rise time, or the time it takes for the curve to reach its steady state region, is greater than for larger steady state magnitudes. Thus, the greater the conditioned weight (i.e. amount of product material remaining) the shorter the rise time. Conversely, the smaller the conditioned weight the longer the rise time.

Also from FIG. 3, it can be seen that the duration of the alarm signal is a direct function of the amount of time required for the conditioned weight signal to cross a designated set point after each reapplication of power by timer circuitry 46. This designated set point corresponds to the conditioned weight level at which the operator desires the alarm to be sounded. Thus, it can be seen that as the steady state magnitude of the conditioned weight signal decreases, which corresponds to a decrease in the product weight remaining, the duration of the alarm signal increases accordingly. In the above manner, the alarm signal first arises as a set of short beeps or visual indications, which grow increasingly longer as the product weight, or conditioned weight, approaches the set point, or alarm weight. When the steady state magnitude of the conditioned weight falls below the set point, the alarm signal has a constant duration.

The time constant T is selected to be much larger than the integration constant for the time delay integrator 80. Thus, where the alarm signal from level detector 74 is very short, corresponding to a substantial quantity of product material 12 remaining, time delay integral 80 will filter out such signal and no alarm will issue. Conversely, as the alarm signal increases in duration, time delay integrator 80 will permit a larger and larger pulse to pass to the relay driver 82, thus providing an alarm of increasing duration.

In the above manner an early warning alarm system is implemented.

Returning to FIG. 2, it can be seen that alarm set control 38, which can comprise a variable voltage divider, derives the reference magnitude from a reference voltage source 96. This reference voltage source 96 also supplies power to Cal Lo circuit 60 and Cal Hi circuit 64. By utilizing a common reference voltage source, the alarm function of the present invention is able to "track" the weight which is displayed by the display 30. Thus, as the ambient temperature changes, resulting in a shift of the DC offset voltages from Cal low 60 and coarse calibration signal from Cal high 64, the reference magnitude will shift proportionally so that the set point or target point supplied to level detector 74 will shift in a manner which tracks the DC offset and coarse calibration signals.

Remaining with FIG. 2, it can be seen that switch 54 receives on terminal 54-D the Cal-Lo signal from Cal-Lo circuit 60. Also, the alarm reference magnitude is supplied to terminal 54-A of switch 54. The wiper 54-R of switch 54 is then connected to voltage follower 98 for output to an external user, such as a computer. It can also be seen from FIG. 2 that the conditioned weight signal from integrator 56 is also supplied to external users, such as a computer, through voltage follower 100.

Provision of these signals to external users permit the present invention to be utilized in a computerized control system, for example. These signals are provided to the computer in analog form, and it is assumed that the computer system will provide appropriate circuitry to convert the analog signal into digital form. From these signals, the computer can monitor the gross weight, or the product weight, or the alarm referenced product weight of the present invention. It is contemplated that the computer would derive rate of change information, and an absolute product weight measurement, in addition to other system parameters from the above analog signals. In response to this information, the computer could then provide control signals to flow valves connected to the cylinder 10, in FIG. 1, as well as provide warning information to the user via printer or other control type functions.

Figure 4:
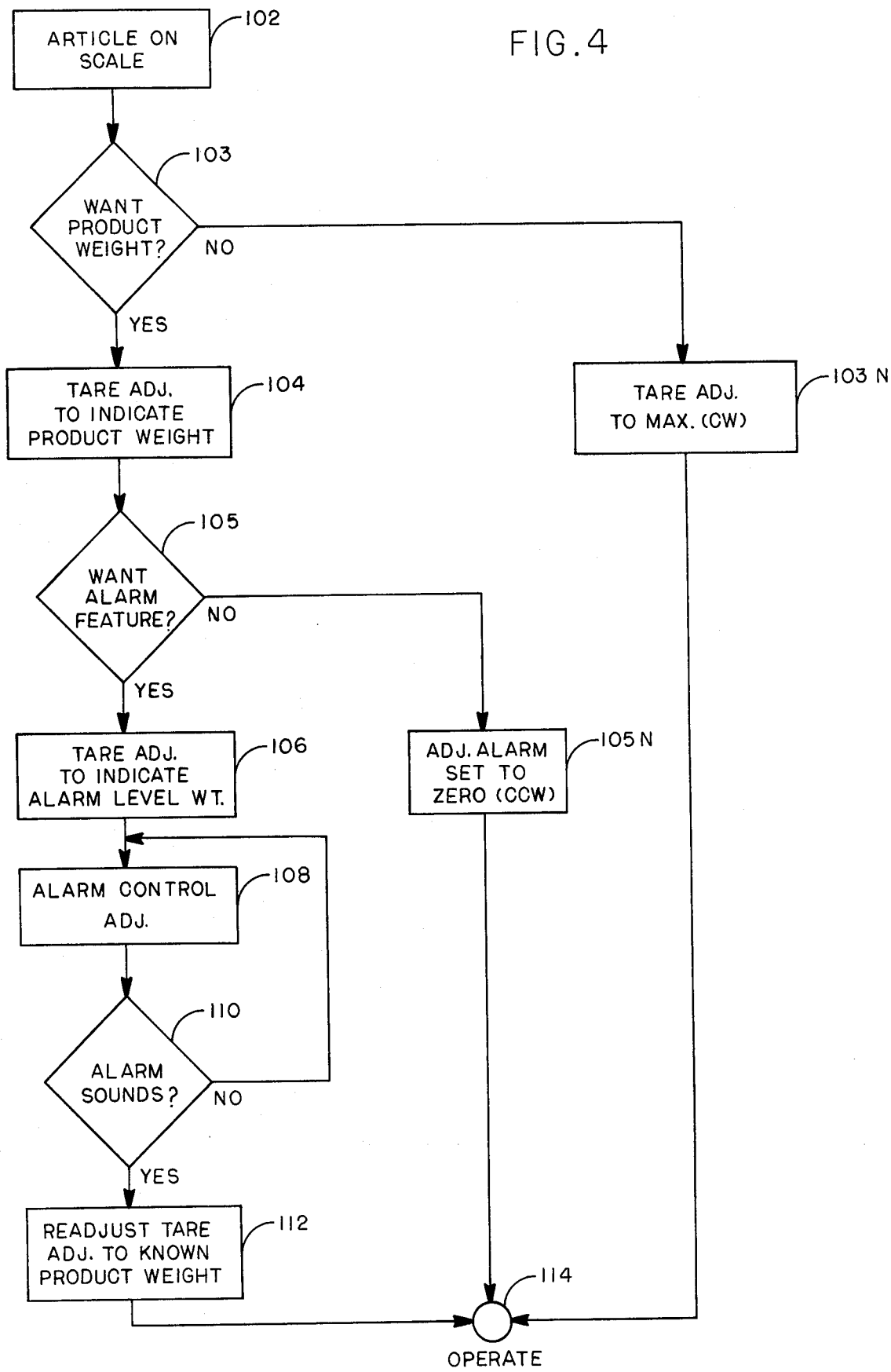
FIG. 4 is a flow diagram of the procedure by which the present invention is utilized to monitor product weights in a typical application.

Referring to FIG. 4, the typical operation of the present invention will now be described. In step 102, the article is placed on the scale. In step 103, the operator decides whether to use the product weight feature. If the product weight feature is desired, the operator proceeds to step 104. If not, step 103N is executed in which the tare adjust control 36 is set to its maximum level so that 100 percent of the gross weight signal is passed to integrator 56. The operator then proceeds to step 114 to operate the apparatus.

Where the product weight feature is desired and given a known product weight, tare adjust 36 is adjusted in step 104 so that the digital display 30 indicates the product weight. In step 105, the operator decides whether to utilize the alarm feature. If yes, step 106 is next executed. If no, alarm adjust 38 is set to zero.

In step 106, the operator adjusts the tare control so that the digital display indicates the desired alarm level weight. The operator then adjusts the alarm set control 38 until the alarm light 32 comes on or the horn 34 sounds, steps 108 and 110. When the alarm sounds, the tare adjust control 36 is re-adjusted so that the digital display 30 again indicates the known product weight, step 112. Once this step is completed, the system is now ready for alarm operation.

In operation, display 30 will indicate the product weight in the units selected by jumper 70. The timer circuit 46 periodically applies power to the gross weight measuring means so that ratio detector 48 produces a gross weight signal which has a steady state magnitude proportional to the weight of the product 12 and the cylinder 10. This gross weight signal is processed by tare adjust 36 and integrator 56 to produce a conditioned weight signal which is a fractional portion of the gross weight signal. This fractional portion corresponds, upon initial adjustment of the system, to the known product weight. The conditioned weight signal is then supplied to VCO 62 where it is converted into a frequency, and thence to counter 66 where the number of cycles within a predetermined period are counted. This cycle count is thence displayed via display 30 as the weight of the product material remaining in the cylinder 10.

The conditioned weight signal is also supplied to level detector 74 where it is compared against a reference magnitude signal from alarm set control 38. This reference magnitude signal represents the trigger point or set point at which the operator desires that an alarm be sounded in order to indicate that the product weight has reached a critically low level. Due to the periodic activation of the gross weight measuring unit 14, the comparison conducted by level detector 74 results in an output alarm signal which has a duration that increases as the product weight level approaches the target or alarm level. Thus, an alarm indication having increasing duration is produced as the product level decreases. In this manner, the operator is supplied with both an early warning of the approach of the product weight to the alarm level, as well as an indication of how close the product weight is to the alarm level.

It should be noted that as the product weight decreases, the total weight of the cylinder and remaining product decrease correspondingly. Thus, load cell 40 provides a signal having a phase and magnitude which indicates such a decreasing weight. Ratio detector 48 converts this change in magnitude and phase into a gross weight signal which has a correspondingly smaller magnitude. Due to the smaller magnitude, the conditioned weight signal from integrator 56 has a longer rise time. Thus, when the gross weight measuring means 14 is reset, the conditioned weight signal from integrator 56 takes a longer time to return from zero through the alarm set level to a steady state magnitude. As long as the conditioned weight signal is below the set level, an alarm signal will be provided by level detector 76.

In the above manner, a weight monitoring apparatus is provided which can be used in a computerized control system, and which provides a visual display of the remaining product weight, as well as provides an alarm signal for the operator which indicates that the alarm level is being approached and also the distance from the alarm level.

In one embodiment of the present invention the gross weight measuring means 14 including ratio detector 48, the VCO 62, integrator 56, summing circuit 58, the Cal-Hi 64, Cal-Lo 60 and Reference Voltage 96, the counter 66, display 30 and count interval turner 68 and count delay timer 72 are embodied in a commercially available Electronic Digital Scale, Model EDS-1B2, manufactured by the General Electric Company. This scale is modified for incorporation into the present invention. The modifications include the addition of the tare adjust means 36 to the output of the ratio detector 48; the addition of timer 46 to periodically switch the gross weight measuring means 14, counter 66 and timers 68 and 72, off and on; provision for jumper 70 to modify the time interval from count interval timer 68; and the addition of an external power supply and reset control 114, FIG. 2. In addition to the above modifications, electrical connections are provided to the output of the ratio detector 48 and to the output of Cal Lo 60 and reference voltage 96 for use by the external user.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

We claim:

1. An apparatus for monitoring the weight of an article in relation to a selectable alarm weight, comprising:
scale means for providing a periodic gross weight signal having a magnitude which is indicative of the weight of the article;
tare means responsive to the periodic gross weight signal for generating a conditioned weight signal having a steady state magnitude which is a selectable fraction of the periodic gross weight signal magnitude; and alarm means responsive to the conditioned weight signal for generating an alarm indication whenever the magnitude of the conditioned weight signal is less than the selectable alarm weight.

2. The apparatus of claim 1, wherein the periodic gross weight signal is a direct current voltage and furtherwherein the tare means comprise voltage divider means responsive to the periodic gross weight signal for providing a fractional signal which is the selected fraction of the periodic gross weight signal;

integration means responsive to the reduced signal and having the predetermined time constant for generating the conditioned weight signal, wherein the rise time of the conditioned weight signal is determined by the time constant and the magnitude of the fractional signal.

3. The apparatus of claim 2, wherein the voltage divider means is a potentiometer and further wherein the periodic gross weight signal is applied across the end terminals of the potentiometer and the fractional signal is provided from the wiper of the potentiometer.

4. The apparatus of claim 2, wherein the voltage divider means provides a constant load impedance to the periodic gross weight signal.

5. The apparatus of claim 1 wherein the tare means further include integrator means for processing the conditioned weight signal so that the conditioned weight signal has a rise time which is inversely proportional to the steady state magnitude of the conditioned weight signal, wherein the rise time is determined according to a predetermined time constant, so that the alarm indication increases in duration as the weight of the article approaches the alarm weight.

6. The apparatus of claim 5, wherein the scale means comprise means for measuring the gross weight of the article and for providing a gross weight signal having a magnitude indicative of the gross weight of the article; and means for periodically resetting the measuring means so that the magnitude of the gross weight signal is momentarily set to zero when the measuring means are reset.

7. The apparatus of claim 6, wherein the resetting means resets the measuring means every 15 seconds.

8. The apparatus of claim 5, wherein the alarm means comprise voltage reference means for supplying the selectable alarm level;

voltage comparator means responsive to the conditioned weight signal and to the selected alarm level for providing a drive signal whenever the conditioned weight signal is less than the selected alarm level; and means responsive to the drive signal for providing the alarm indication whenever the drive signal is present.

9. The apparatus of claim 8 which is incorporated into a computer system further including output buffer means having an input which is selectively responsive to the periodic gross weight signal, to the product weight signal, to the adjustable reference, and to the display zero reference, for providing a selectable periodic gross weight analog signal, a product weight analog signal, and an adjustable reference product weight analog signal which are suitable for further processing by the computer system.

10. The apparatus of claim 8, wherein the alarm indication means is an audible indication device.

11. The apparatus of claim 8, wherein the alarm indication means is a visual indication device.

12. The apparatus of claim 5 further including means responsive to the conditioned weight signal for providing a visual indication of the steady state magnitude of the conditioned weight signal.

13. The apparatus of claim 12, wherein the visual indication means comprise oscillator means responsive to the conditioned weight signal for providing a periodic signal having a frequency which is a function of the steady state magnitude of the conditioned weight signal;

means for counting the number of cycles in the periodic signal occurring within a sampling time interval having a selected duration; and means responsive to the cycle count for providing a numerical display of the cycle count.

14. The apparatus of claim 13, wherein the duration of the sampling time interval is selected so that the cycle count is indicative of the conditioned weight in weight units of pounds.

15. The apparatus of claim 13, wherein the duration of the sampling time interval is selected so that the cycle count is indicative of the conditioned weight in weight units of kilograms.

16. The apparatus of claim 13, wherein the cycle counting means include timing means for generating a timing signal having a predetermined duration; and counter means, responsive to the periodic signal and to the timing signal, for counting the number of cycles in the periodic signal for the duration of the timing signal.

17. The apparatus of claim 13, wherein the numerical display means is a segment display.

18. A method for monitoring the weight of an article in relation to a selectable alarm weight, comprising the steps of providing a periodic gross weight signal having a magnitude which is indicative of the weight of the article;

generating a conditioned weight signal from the periodic gross weight signal, the conditioned weight signal having a steady state magnitude which is a selectable fraction of the periodic gross weight signal magnitude; and generating an alarm indication whenever the magnitude of the conditioned weight signal is less than the selectable alarm weight.

* * * * *